March 7, 1944.  J. F. LUHRS  2,343,619
MEASURING AND CONTROL SYSTEM
Filed Sept. 21, 1940  5 Sheets-Sheet 1

Inventor
JOHN F. LUHRS
By Raymond D. Junkins
Attorney

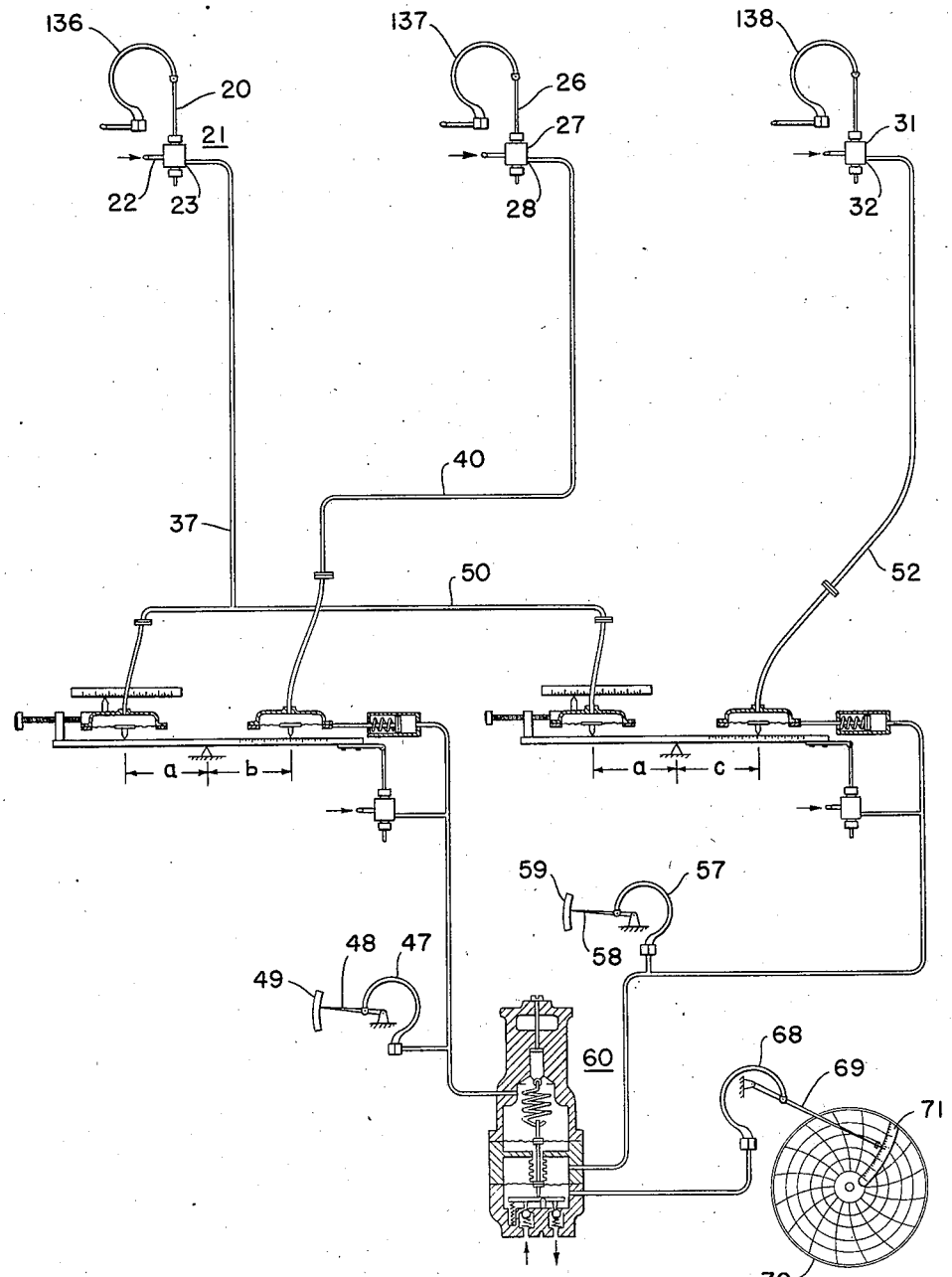

Patented Mar. 7, 1944

2,343,619

UNITED STATES PATENT OFFICE 2,343,619

MEASURING AND CONTROL SYSTEM

John F. Luhrs, Cleveland Heights, Ohio, assignor to Bailey Meter Company, a corporation of Delaware Application September 21, 1940, Serial No. 357,787

11 Claims. (Cl. 122—448)

This invention relates to the art of determining the relative or absolute magnitude of a variable, and particularly to the determination of a variable such as the density of a fluid in the vapor, liquid, or vapor-liquid phase. It will be apparent that my invention may be used to determine the relation between like or unlike physical variables, such as pressures, temperatures, etc., or to determine the proportion between abstract variables, such as numbers or mathematical functions.

More particularly my invention relates to a method of an apparatus for determining the density of a flowing fluid at a particular point in its flow path, and further to the determination of the mean density of a flowing fluid through a particular section of its flow path.

Such determinations as my invention gives may be used in the control of a variable directly or indirectly through regulation of an agent or agents producing, maintaining, or otherwise affecting the variable, or it may be used to give a visual indication thereof.

I have chosen to illustrate and describe as a preferred embodiment of my invention its adaptation to the measuring and controlling of the density and other characteristics of a flowing heated fluid stream, such as the flow of hydrocarbon oil through a cracking still.

While a partially satisfactory control of the cracking operation may be had from a knowledge of the temperature, pressure, and rate of flow of the fluid stream being treated, yet a knowledge of the density of the flowing stream at different points in its path is of a considerably greater value to the operator, but was not available prior to the discovery by Robert L. Rude, as claimed in his copending application Serial No. 700,485.

In the treatment of water below the critical pressure, as in a vapor generator, a knowledge of temperature, pressure and rate of flow may be sufficient for proper control, inasmuch as definite tables have been established for interrelation between temperature and pressure, and from which tables the density of the liquid or vapor may be determined. However, there are no available tables for determining the density of a hydrocarbon in the liquid-vapor phase.

In the processing of a fluid, such as petroleum hydrocarbon, a change in density of the fluid may occur through at least three causes:

1. The generation or formation of vapor of the liquid, whether or not separation from the liquid occurs.
2. Liberation of dissolved or entrained gases.
3. Molecular rearrangement as by cracking or polymerization.

The result is that no temperature-pressure-density tables may be established for any liquid, vapor, or liquid-vapor condition of such a fluid, and it is only through actual measurement of the density of a mixture of the liquid and vapor that the operator may have any reliable knowledge as to the physical condition of the fluid stream at various points in the treatment.

It will be readily apparent to those skilled in the art that the continuous determination of the density of such a flowing stream is of tremendous importance and value to an operator in controlling the heating, mean density, time of detention in a given portion of the circuit, etc. A continuous knowledge of the density of such a heated flowing stream is particularly advantageous where wide changes in density occur due to formation, generation, and/or liberation of gases, with the resulting formation of liquid-vapor mixtures, velocity changes, and varying time of detention in different portions of the fluid path. In fact, for a fixed or given volume of path, a determination of the mean density in that portion provides the only possibility of accurately determining the time that the fluid in that portion of the path is subjected to heating or treatment. By my invention I provide the requisite system and apparatus wherein such information is made available continuously to an operator, and furthermore may comprise the guiding means for automatic control of the process or treatment.

While illustrating and describing my invention as preferably adapted to the cracking of petroleum hydrocarbon, it is to be understood that it may be equally applicable to the vaporization or treatment of other liquids and in other processes.

In the drawings:

Fig. 6 is similar to Fig. 1 but illustrates pressure sensitive means.

Figures 1, 2:
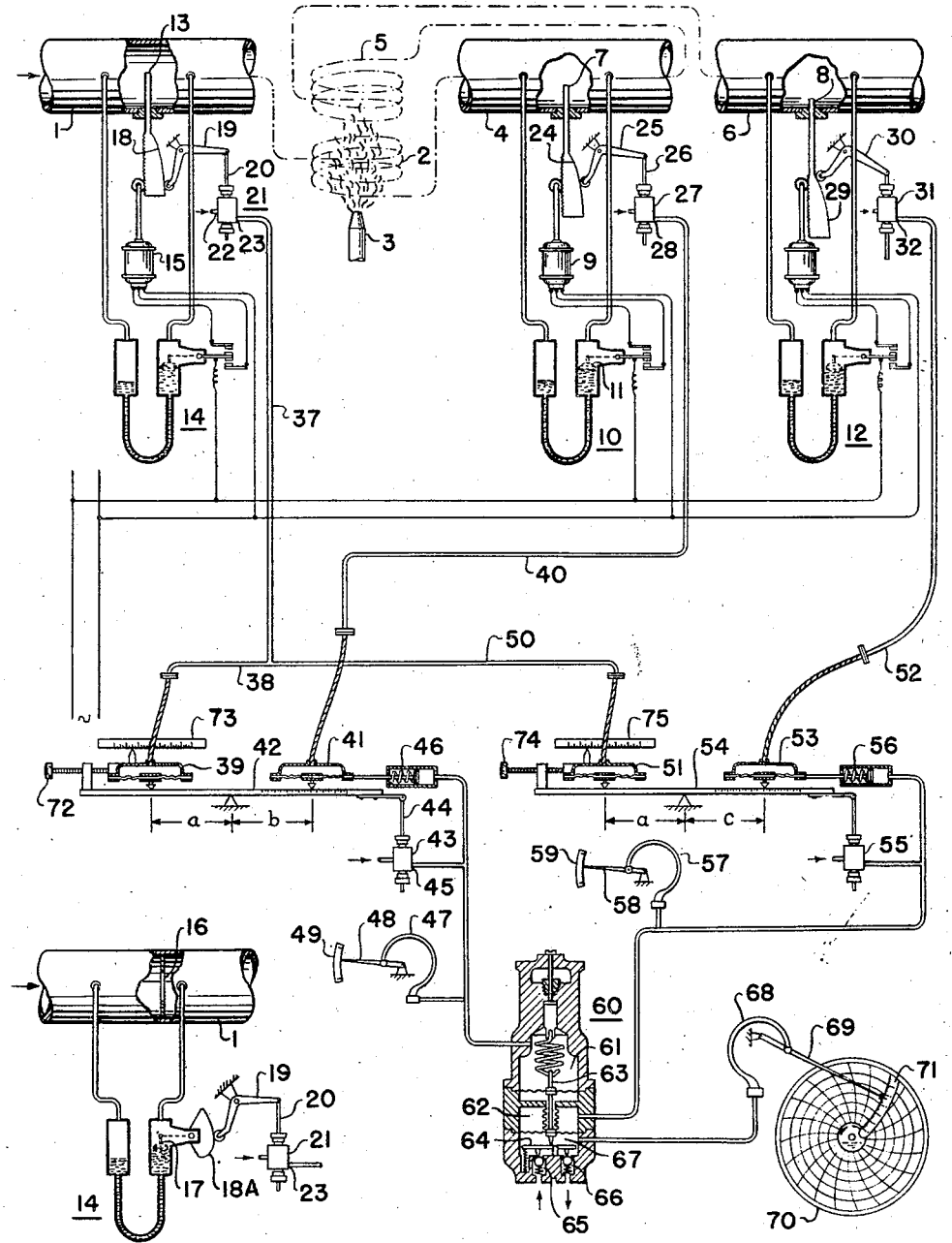
Fig. 1 is a diagrammatic representation of density measuring apparatus for a heated stream, and of mean density measuring apparatus of the stream through a portion of its flow path.
Fig. 2 is a modification of a part of Fig. 1.

Referring now in particular to Fig. 1, I indicate a conduit 1 which may be considered as comprising the once through fluid path of an oil still where a portion of the path, such as the coil 2, is heated by a burner 3. After passing through the coil 2 the fluid is passed through a section of the conduit 1, designated by the numeral 4, and thence returned to a coil 5 for further heating by the burner 3. The heating coil 2 will be hereinafter referred to as a first heating section, while the coil 5 will be referred to as a second heating section. In the preferred arrangement of the operation of the still the section 5 is the conversion or cracking section, and the one in which it is primarily desirable to continuously determine the mean density of the fluid. After leaving the second heating section the fluid is discharged from the still through a conduit 6, comprising in reality a section of the conduit 1.

In accordance with my invention I determine the density of the fluid at the location 4 by causing the fluid to pass through a variable area obstruction, such as an orifice 7, varying the area of the orifice 7 to maintain a constant differential thereacross, and determining the ratio of the weight rate of fluid flow through the flow path to a function of the area of the orifice. Likewise the density of the fluid at the location 6 may be determined from the ratio of the weight rate of fluid flow to a function of the area of a variable area orifice 8. The mean density through the second heating section 5 may be determined by averaging the density of the fluid at the locations 4 and 6. That the density of a flowing fluid may be so obtained will be apparent from a consideration of the following mathematical development.

Let:

$W_r$ = the weight rate of fluid flow
$D_I$ = density of the fluid at orifice 7
$D_O$ = density of the fluid at orifice 8
$D_m$ = mean density across the second heating section 5
$h_I$ = $K_I$ = differential maintained across orifice 7
$h_O$ = $K_O$ = differential maintained across orifice 8
$A_I$ = area of orifice 7
$A_O$ = area of orifice 8

The basic formula for an orifice is:

$$W = KCFA\sqrt{HD} \quad (1)$$

Where:

W = weight rate of flow
K = a constant
C = experimental coefficient
F = approach factor
A = area of the orifice
H = differential pressure across orifice
D = density of the fluid at the orifice Therefore at orifice 7

$$W_r = (KCFA)_I\sqrt{K_I D_I} \quad (2)$$

and $$D_I = \frac{W_r^2}{(KCFA)_I^2 K_I} \quad (3)$$

but C and F for any one orifice are substantially constant and if variable are functions of A. Therefore:

$$D_I = \frac{W_r^2}{f(A_I)} \quad (4)$$

and:

$$D_O = \frac{W_r^2}{f(A_O)} \quad (5)$$

and $$D_m = \frac{D_I + D_O}{2} = \frac{1}{2}\left(\frac{W_r^2}{f(A_I)} + \frac{W_r^2}{f(A_O)}\right) \quad (6)$$

The orifices 7 and 8 are shown as flat plates movable transversely in the sections 4 and 6 respectively to vary the free area of the orifice. While I have found such orifices as illustrated and known in the art as "segmental orifices" to be satisfactory, it will be apparent that any other type of partial obstruction may be employed. The orifice 7 is positioned transversely in the section 4 to maintain a constant differential by means of a reversible motor 9 under the control of a device such as a U-tube generally indicated at 10 and sensitive to the differential across the orifice 7.

In one leg of the U-tube 10 is a float 11 positioned in accordance with the differential across the orifice 7. When the differential across the orifice 7 departs from a predetermined constant value the float 11 closes an electric circuit causing the motor 9 to rotate in one direction or the other and thus vary the area of the orifice 7 until the differential thereacross is restored to the predetermined value.

The differential across the orifice 8 is maintained at a predetermined constant value by means of a similar device generally indicated at 12. The differential pressures maintained across the orifices 13, 7 and 8 may be the same, or they may be different. So long as they are maintained at predetermined constant values, differences in their absolute values may be properly compensated for in the design of the apparatus, as will be evident to those skilled in the art.

To obtain a measure of the weight rate of fluid flow through the conduit 1 I may employ any known device for metering fluid flows. In the embodiment of my invention disclosed in Fig. 1 I have disclosed a meter of the rate of flow similar to the devices I have described for maintaining a constant differential across the orifices 7 and 8. From the Formula 1 given above it is apparent that if the head H across an orifice and the density D remains constant, then the weight rate of flow will vary as a function of the orifice area A. The fluid before passing through the first heating section 2 is substantially constant in density and accordingly the orifice area across which a constant differential pressure is maintained will be a measure of the rate of fluid flow. Such changes in density as may be encountered and which are usually given in terms of specific gravity may be properly compensated for in a manner hereinafter to be described.

In the conduit 1 ahead of the first heating section 2 I show a variable area orifice 13 across which a constant differential pressure is maintained by means of a U-tube generally indicated at 14 controlling a motor 15. Assuming, for example, that there is a decrease in the rate of flow through the conduit 1, then the differential across the orifice 13 will tend to decrease, thereby effecting energization of the motor 15 in proper direction to decrease the free area of the orifice. Upon an increase in the rate of flow to the conduit 1 the opposite action will occur, the motor 15 rotating in direction to increase the free area of the orifice to restore the differential thereacross to the desired value.

Further consideration of the Formula 1 above will indicate that if the density D and the area A are constant, then the flow through an orifice will vary as the square root of the differential pressure H. Accordingly, I may in place of utilizing a variable orifice, such as I have illustrated in Fig. 1, use the alternate arrangement shown in Fig. 2 where the device 14 is sensitive to the differential produced by a constant area orifice 16 which may be positioned in the conduit 1 in lieu of the variable area orifice 13.

A float 17 in one leg of the device 14 will accordingly be positioned proportional to the differential pressure across the orifice 16, and the motion thereof may be utilized to produce an effect varying in accordance with the weight rate of flow through the conduit 1 as hereinafter described.

My invention contemplates producing a first measurable effect varying in proper functional relation to the weight rate of fluid flow, a second measurable effect varying in proper functional relation to the area of the orifice 7 and a third measurable effect varying in proper functional relation to the area of the orifice 8. From the ratio between the first and second effects I am able to determine the density of the fluid at the orifice 7; from the ratio between the first and third effects the density of the fluid at the orifice 8 may be determined. By further producing an effect varying as each of said ratios and determining the sum (and thereby the average) of the last named effects, I may obtain a measure of the mean density through the second heating section 5. In the embodiment of my invention shown in Fig. 1, I utilize fluid pressures as the "measurable effect," and through the agency of proper instrumentalities hereinafter to be described determine the ratio and the sum of such ratios to determine the density at the orifices 7 and 8 and the mean density of the fluid within the second heating section 5.

Referring to Fig. 1 I show the stem of the orifice 13 provided with a shaped cam section 18 against which rides a pivoted cam follower 19, to which is connected the movable valve stem 20 of a pilot valve 21. The pilot valve 21 may be of the type shown and described in United States Patent 2,054,464 to Clarence Johnson. Pressure fluid from a suitable source is admitted through a centrally located inlet port 22 and is so controlled that for every position of the valve stem 20 there will be a definite pressure established in the outlet port 23. Accordingly, as the follower 19 is angularly positioned, due to changes in position of the orifice 13, there will be a definite predetermined change in the fluid pressure at the outlet port 23. Briefly, therefore, for each position of the orifice 13 there will be a definite pressure established by the pilot valve 21.

The cam section 18 may be properly shaped to correspond to the functional relation existing between the position of the orifice 13 and the fluid pressure which it is desired to establish by the pilot valve 21. Thus referring to Formula 4 above, for example, it is apparent that the fluid pressure established by the valve 21 should vary as the square of the weight rate of fluid flow. Inasmuch as from Formula 1 it is apparent that the flow varies directly with the orifice area the cam section 18 should be so shaped as to cause the fluid pressure established by the pilot 21 to vary as the square of the orifice area. The shape of the cam section 18 may be further warped to properly compensate for changes in experimental coefficient, approach factor, and other factors varying in relation to orifice area.

To establish a fluid pressure varying in proper functional relation to the area of the orifice 7, I provide an arrangement similar to that described with reference to the orifice 13. The orifice 7 is provided with a suitably shaped cam section 24, which through the agency of a follower 25 positions a movable valve stem 26 of a pilot valve 27. The fluid pressure established at the outlet port 28 of the pilot valve 27 will accordingly be in proper functional relation to the position of the orifice 7. Likewise I show the orifice 8 provided with a suitably shaped cam section 29, which through a follower 30 and pilot valve 31 establishes a fluid pressure at an outlet port 32 varying in proper functional relation to the position of the orifice 8.

The fluid pressure established by the pilot 21 is transmitted through a pipe 37 and branch 38 to a fluid pressure weighing device 39. The fluid pressure established by the pilot 27 is transmitted through a pipe 40 to a device 41 similar to the device 39. The devices 39 and 41 bear against a fulcrumed lever 42 and impress thereon opposed forces proportional to the magnitude of the fluid pressures established by the pilots 21 and 27 respectively.

The torque produced by the device 39 and tending to position the lever 42 in a counterclockwise direction will be proportional to the product of the fluid pressure established by the pilot 21 and the distance the device 39 is from the fulcrum of the lever 42. Likewise the torque produced by the device 41 will be proportional to the pressure established by the pilot 27 multiplied by the distance the device 41 is from the fulcrum of the lever 42. Inasmuch as the forces produced by the devices 39 and 41 are opposed, the following mathematical relation will exist when the lever 42 is in equilibrium or neutral position:

$$F_{39} \times a = F_{41} \times b \qquad (7)$$

where:
$F_{39}$ = Force produced by device 39
$F_{41}$ = Force produced by device 41
$a$ = Moment arm of device 39
$b$ = Moment arm of device 41 and:

$$\frac{F_{39}}{F_{41}} = \frac{b}{a} \qquad (8)$$

but by construction:

$$F_{39} = W_F^2$$
$$F_{41} = f(A_I)$$
$$a = K = \text{a constant}$$

therefore:

$$\frac{b}{a} = \frac{W_F^2}{f(A_I)} \qquad (9)$$

or:

$$b = \frac{W_F^2}{f(A_I)} = D_I \qquad (10)$$

From Equation 10 it is apparent that if the moment arm of the device 39 is maintained constant and the moment arm of the device 41 varied to maintain the lever 42 in equilibrium, then the moment arm of the device 41 becomes a measure of the density of the fluid at the variable area orifice 7.

To maintain the lever 42 in equilibrium or in neutral position I employ a pilot valve 43 having a movable stem 44 pivotally connected to the lever 42. The pressure established by the pilot 43 is effective for positioning the device 41 through a fluid pressure servo-motor diagrammatically illustrated at 46. In operation, assuming that the lever 42 is displaced in a counterclockwise direction from the neutral position, the loading pressure established by the pilot 43 will immediately decrease, causing the servo motor 46 to position the device 41 in a direction increasing the moment arm $b$ until the increase in torque caused thereby is sufficient to restore the lever to the neutral position. Conversely, a displacement of the lever 42 in a clockwise direction will affect an increase in the loading pressure established by the pilot 43 to decrease the moment arm $b$ until the lever is again restored to the neutral position.

As shown, I may suitably graduate the lever 42 so that the magnitude of the moment arm $b$ may be determined directly or, if preferred, I may graduate the lever 42 to read directly in terms of density of the fluid at the orifice 7. As the fluid pressure established by the pilot 43 and necessary to maintain the lever 42 in neutral position varies with the length of the moment arm $b$, it is apparent that the magnitude of this fluid pressure may be used as an indication of the density of the fluid. In Fig. 1 I have shown such an arrangement where a pressure sensitive Bourdon tube 47 is arranged to position an index 48 relative to a scale 49, which may be graduated to read directly in terms of density.

If in lieu of the variable area orifice 13 the arrangement for obtaining a measure of the weight rate of flow shown in Fig. 2 is used, then the float 17 may be arranged to operate a suitably shaped cam 18A so that the fluid pressure established by the pilot 21 will bear the desired functional relation to the rate of fluid flow through the conduit 1.

To obtain a measure of the density of the fluid at the orifice 8 I utilize an arrangement similar to that described for determining the density of the fluid at the orifice 7. As shown in Fig. 1, the loading pressure established by the pilot 21 is transmitted through a branch conduit 50 to a fluid pressure weighing device 51, and that established by the pilot 31 is transmitted through a pipe 52 to a fluid pressure weighing device 53. The devices 51 and 53 bear against a fulcrumed lever 54 in opposed relation and the moment arm of the device 53 is varied through the agency of a pilot valve 55 and fluid pressure operated servo-motor 56 to maintain the fulcrumed lever 54 in neutral position.

As demonstrated mathematically with reference to the determination of the density at the orifice 7 it may be shown that:

$$c = \frac{W r^2}{f(A_o)} = D_o \qquad (11)$$

Accordingly by suitably graduating the lever 54 I may obtain a direct visual indication of the density at the orifice 8 or I may employ the loading pressure established by the pilot 55 to actuate a proximate or remotely located Bourdon tube 57 and index 58 to give an indication of the density relative to a scale 59.

From Equation 6 above it is apparent that the mean density of the fluid in the second heating section 5 is proportional to the sum of the loading pressures established by the pilot valves 43 and 55. In determining the mean density in the embodiment of my invention shown in Fig. 1 I establish a fluid pressure proportional to the sum of the said two loading pressures and utilize the latter pressure to actuate a suitable exhibiting means. I obtain this latter fluid pressure which is proportional to the sum of the two loading pressures through the agency of a device generally indicated at 60 and illustrated and described in United States Patent 2,098,913 to P. S. Dickey.

The loading pressure established by the pilot 43 is transmitted to a chamber 61, whereas that established by the pilot 55 is transmitted to a chamber 62. Each of the chambers 61 and 62 has one wall, consisting of a pressure sensitive diaphragm which diaphragms are connected together for simultaneous movement by a member 63. The force tending to move the member 63 downward will therefore be proportional to the sum of the pressures within the chambers 61 and 62. The member 63 is arranged to actuate, by means of a fulcrumed lever 64, a fluid pressure supply valve 65 or an exhaust valve 66 when moved from the neutral position in which it is shown. The valves 65 and 66 control the admission and discharge of pressure fluid from a chamber 67, which is separated from the chamber 62 by the pressure sensitive diaphragm. Accordingly the member 63 is urged upwardly by a force proportional to the magnitude of the pressure within the chamber 67.

When the fluid pressure within the chamber 67 is equal to the sum of the pressures within the chambers 61 and 62 the supply and exhaust valves 65 and 66 will be closed, whereas if the pressure 67 is less than that within chambers 61 and 62 the supply valve 65 will be opened until the pressure within chamber 67 has increased to again be equal to the sum of the pressures within chambers 61 and 62. Conversely, if the pressure within chamber 67 exceeds the sum of the pressures within chambers 61 and 62, then the exhaust valve 66 will be opened until the pressure within chamber 67 has been reduced sufficiently to restore equilibrium.

Due to the action of the device 60 the pressure within the chamber 67 will continuously stand in direct proportion to the sum of the densities of the fluids at the orifices 7 and 8, and accordingly its magnitude may be taken as a measure of the mean density of the fluid within the second heating section 5. To obtain a visual indication of the magnitude of the pressure within chamber 67, I show connected thereto a pressure sensitive Bourdon tube 68 arranged to position an index 69, which may be provided with a stylus to record the mean density on a suitably graduated time rotatable chart 70 and to indicate the same relative to a graduated scale 71.

It will be understood that the indicating and recording arrangement I have shown is intended to be merely diagrammatic and that I may employ other devices for obtaining a visual indication of the pressure with the chamber 67 as will be apparent to those skilled in the art. It will be further apparent that I may utilize the pressure established within the chamber 67 to control the processing of the fluid through the heating sections 2 and 5 through the agency of suitable instrumentalities.

Figure 4:
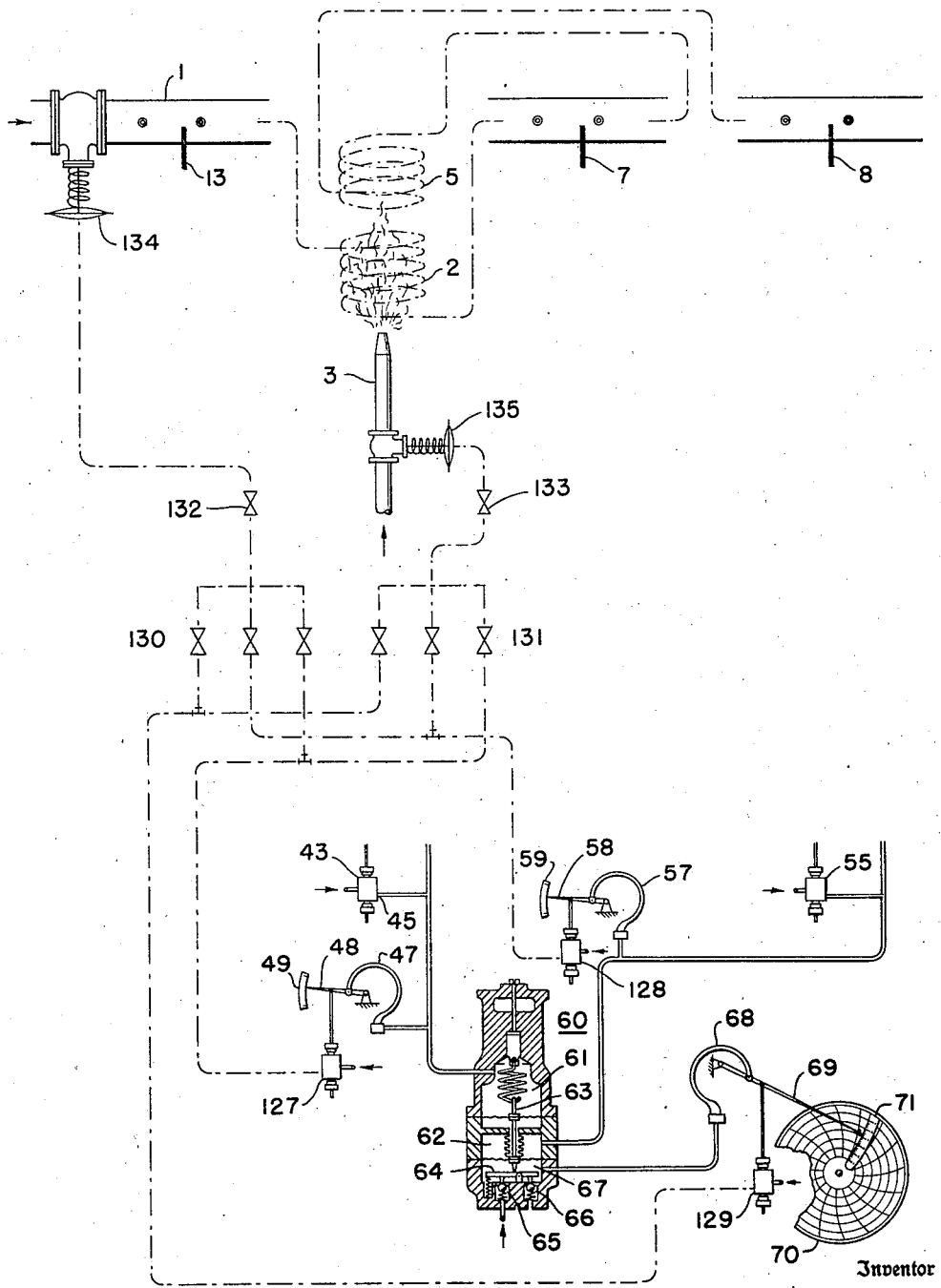
Fig. 4 is a diagrammatic representation of the apparatus of Fig. 1 and including control provisions.

Referring to Fig. 4 I show therein the Bourdon tubes 47, 57 and 68 arranged to position respectively the pilot valves 127, 128 and 129 establishing loading pressures representative respectively of fluid density at the orifice 7, fluid density at the orifice 8, and mean density of the fluid in heating section 5. The loading pressures are selectively effective, through the agency of valves 130, 131, 132, 133, in regulation of the control valves 134 and 135. The valve 134 controls the rate of supply of fluid to the treating system while the valve 135 controls the heating burner 3. Thus the treatment of the fluid may be in accordance with a determination of or manifestation of density of the fluid at orifice location 7, or at orifice location 8, or of the mean density of the fluid between the orifice locations 7 and 8.

By proper manipulation of the valves 130, 131, 132 and 133 I may control the rate of charge from density at 7, or at 8, or the mean; and control the heating from density at 7, or at 8, or the mean; and in fact I may accomplish whatever selective control of the treatment which I find most desirable.

As previously indicated the area of the orifice 13 is a measure of the weight rate of flow of fluid through the conduit 1 only so long as the density of the fluid remains constant. Inasmuch as the fluid in the conduit 1 before the first heating section is in stable form, such changes in density as occur are usually of minor magnitude and do not appreciably affect the accuracy of measurement. However, if such changes in density, which are usually reduced to changes in specific gravity, are of sufficient magnitude to materially affect the accuracy of the measurements of the rate of flow I may provide the apparatus disclosed in Fig. 1 with suitable means for correcting for such changes in density. As an example, I have shown the device 39 manually adjustable along the lever 42 so that the moment arm (a) may be varied in suitable functional relation to changes in density to properly correct therefor. I have shown a manually adjustable screw 72, which may be used to position the device 39 so that an index carried thereby corresponds to the density or specific gravity reading given on a suitably graduated scale 73. The density of the fluid within the conduit 1 ahead of orifice 13 may be periodically determined by a hydrometer or other well-known means and then the device 39 adjusted so that the force produced thereby on the beam 42 is suitably compensated for changes in the density or departure of the actual density from the density for which the device was designed.

Likewise the device 51 may be arranged so that changes in initial specific gravity are properly compensated for by means of a manually adjusted screw 74 and scale 75.

Figure 3:
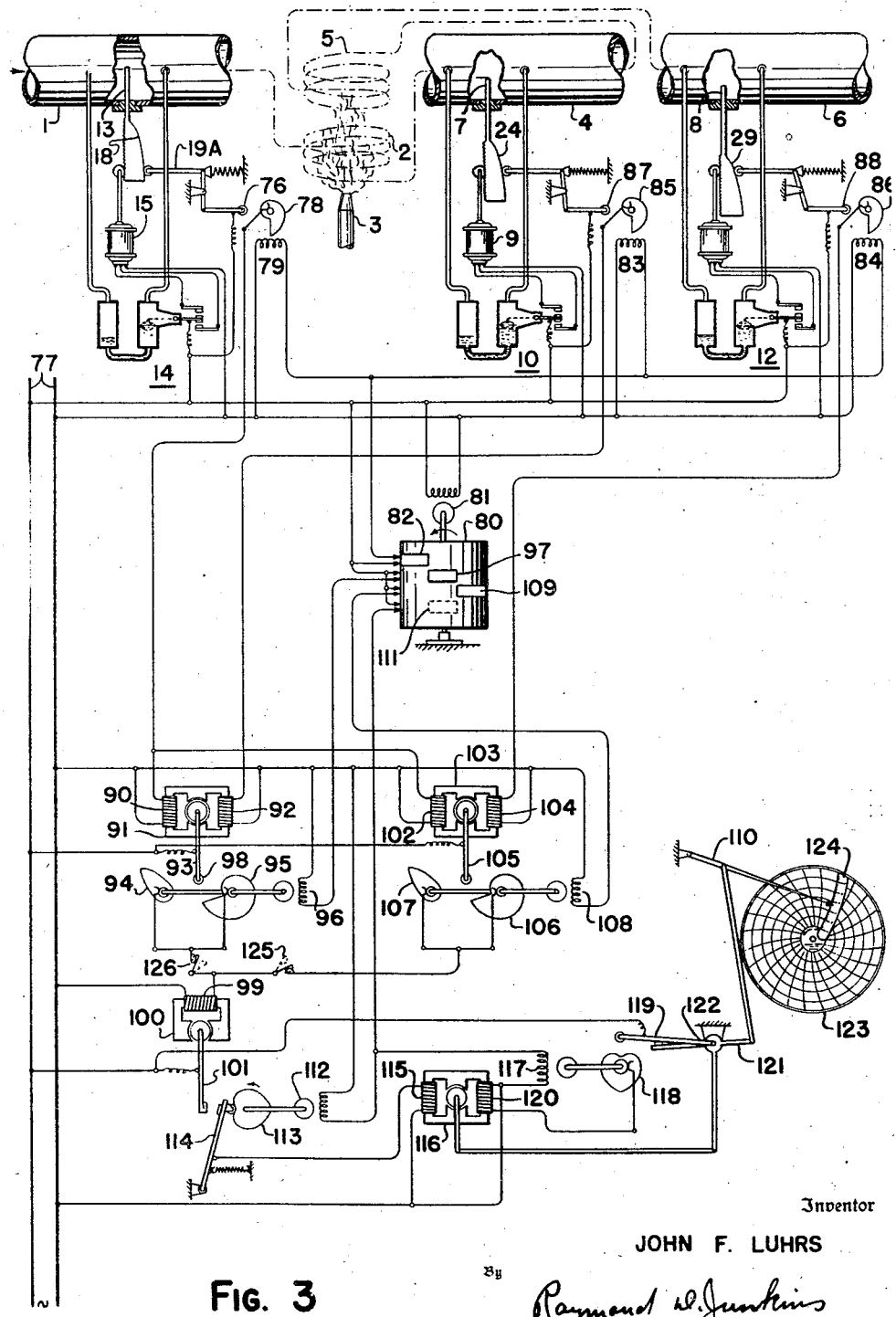
Fig. 3 is a diagrammatic representation of a further embodiment of my invention.

In Fig. 3 I have illustrated a further embodiment of my invention wherein the effects which are established in accordance with the areas of the orifices 7, 8 and 13 are periodic electric impulses of variable time durations and wherein the time durations of the various impulses are compared to determine the density of the fluid at the locations 4, 6, and the mean density of the fluid within the second heating section 5. In comparing the time durations of the impulses I employ the principle of logarithms that I may obtain a ratio through determining the difference in time lengths of the impulses. For example, in determining $D_I$ in accordance with Formula 4 above I obtain periodic impulses proportional in time length to the logarithm of $W_F^2$ and periodic impulses of a time length proportional to $f(A_I)$. Each periodic impulse proportional to $W_F^2$ is compared to the corresponding impulse proportional to $f(A_I)$ and a member positioned in accordance with the difference in time lengths of the said set of impulses. I then obtain an impulse proportional to the antilogarithm of the displacement of the said member from an initial position, which impulse is accordingly proportional in time length to $D_I$. The density at the orifice 8 or $D_O$ may be obtained in similar manner, and the mean density of the fluid within the second heating section 5 may be obtained by suitably adding corresponding impulses proportional in time length to $D_I$ and $D_O$.

I will now describe the means I employ for obtaining periodic simultaneous impulses of a time duration proportional to the logarithm of a function of the area of orifices 13, 8 and 7. Bearing against the cam shape 18 of the orifice 13, for example, is a follower 19A operating a contact 76 connected to a suitable source of current 77. Arranged to periodically engage the contact 76 is a cam 78 intermittently operated by a motor diagrammatically illustrated at 79. The intermittent operation of the motor 79 is obtained by means of a contact drum 80 continuously rotated at constant speed by means of a motor 81. The drum 80 carries a conducting segment 82. During a portion of each revolution of the drum 80 the conducting segment 82 will permit the motor 79 to be energized from the source 77 as an inspection of Fig. 3 will make evident. The length of the segment 82 is sufficient to cause one complete revolution of the cam 78. Accordingly, the normal position of the cam 78 is that shown in the drawing, and upon energization of the motor 79 the cam 78 will be rotated through one complete revolution. Through the use of self-starting synchronous motors the cam 78 may be made to rotate at a uniform rate of speed as will be apparent to those skilled in the art.

During each revolution of the cam 78 the contact 76 will be engaged for an increment of time determined by the shape of the cam section 18 and the cam 78. Through suitably shaping these surfaces the duration of the engagement between contact 76 and cam 78 may be made proportional to the logarithm of $(W_F^2)$. Thus the cam section 18 may be such that the position of the contact 76 will be directly proportional to the said logarithm so that the cam 78 will have a uniform rise, or the logarithmic function may be partially obtained through shaping of the section 18 and the remainder through proper shaping of the cam 78. Again the cam section 18 might be given a uniform rise and the entire logarithmic function obtained through shaping of the cam 78. Regardless of the exact arrangement which may be employed the desideratum is to have the contact 76 engage the cam 78 periodically for an increment of time proportional to the logarithm of $(W_F^2)$.

Simultaneous with the energization of motor 79 similar motors 83 and 84 are operated to rotate cams 85 and 86 through one revolution. As described with reference to the orifice 13, cam sections 24, 29, and cams 85, 86 may be suitably shaped so that in the case of the cam 85 an electric impulse of a time duration proportional to the logarithm of $f(A_I)$ will be obtained through engagement of the cam 85 with a contact 87 and similarly an electric impulse of duration proportional to the logarithm of $f(A_O)$ will be obtained through engagement of the cam 86 with a contact 88.

To obtain now a determination of the ratio of the weight rate of flow of fluid to $f(A_I)$, I effect movement of a member proportional to the difference in time length of the impulses originated by the cams 78 and 85. Engagement of the cam 78 with the contact 76 serves to energize a winding 90 of a self-starting synchronous motor 91 having an opposed winding 92. The winding 92 is energized by engagement of the cam 85 with the contact 87. When windings 90 and 92 are both energized the motor 91 is not urged to rotation, nor is it urged to rotation when both windings 90 and 92 are deenergized. However, when either winding 90 or 92 alone is energized, then the motor 92 will be urged to rotation in a direction depending upon the particular winding energized. Thus energization of the winding 90 may effect rotation in a counterclockwise direction, whereas energization of the winding 92 may effect rotation in a clockwise direction. As the difference in energization of the windings 90 and 92 is proportional to the difference in logarithms it is apparent that the motor 91 will rotate for an increment of time proportional to that difference. Accordingly, a member such as the member 93 positioned by the motor 91 will be periodically moved from the initial position, in which it is shown, for an increment of time and likewise for a distance proportional to the said difference. If the time duration of the electric impulses originating through the agency of the cams 78 and 85 are equal, then the member 93 will remain in the initial position. If the impulse established by the cam 78 is of longer duration than that established by the cam 85 then the member 93 will be moved in one sense from the initial position and if the impulse established by the cam 85 is the longer then the member 93 will be moved in opposite sense from the initial position.

When the member 93 remains in the initial position throughout a complete cycle of operation of the cams 78 and 85 it indicates that a ratio of 1 exists between $W_F^2$ and $f(A_I)$ or that the logarithm of the ratio is zero. Displacement of the member 93 to the left of the initial position as viewed in the drawing indicates a ratio less than 1, or a negative logarithm. Movement of the member 93 to the right of the initial position indicates a ratio greater than 1 or a positive logarithm.

The member 93 is driven by the motor 91 through a friction clutch so that subsequent to each advancement from the initial position it may be returned thereto to obtain an impulse varying in direct proportion to the ratio of $W_F^2$ to $f(A_I)$. Disposed on either side of the member 93 and in operative relation thereto are properly shaped cams 94 and 95 periodically rotated through one revolution subsequent to each advancement of the member 93 by a motor 96. Proper sequential operation of the cams 94 and 95 relative to the operation of member 93 is obtained through drum 80 and a conducting segment 97 thereon.

Subsequent to each cycle of operation of the motors 79 and 83 the motor 96 is energized by means of segment 97, which is of such length that cams 94 and 95 are rotated through one complete revolution and then remain stationary until a further cycle of operation of motors 79 and 83 occurs. When member 93 is displaced to the left, the cam 94 will act to restore it to the initial position, and when displaced to the right, cam 95 will act to restore it to the initial position. The operation of the parts of the apparatus so far described is such that periodically the member 93 will be displaced from the initial position an amount proportional to the logarithm of the ratio of the weight rate of fluid flow to $f(A_I)$ and subsequent to such displacement the member 93 will be restored to the initial position through the agency of cams 94 and 95, which cams are properly shaped so that the time engagement with the member 93 will be proportional to the antilogarithm of the said logarithm.

The cam 95 is provided with a short dwell section at its point of maximum rise, so that if the member 93 remains in the initial position because of a ratio of one existing between $W_F^2$ and $f(A_I)$ it will engage the member for a corresponding increment of time, in this case the cam 94 by virtue of its shape will only momentarily engage the member. Improper engagement between the cam 95 and member 93 is prevented when the member 93 is displaced to the left by having the cam 94 follow the cam 95 so that after such displacement to the left it will not be restored to the initial position until after the dwell of cam 95 has passed.

The member 93 carries a contact 98 which engages the cams 94 and 95 and serves to originate an electric impulse proportional to the said antilogarithm. This electric impulse serves to periodically energize a winding 99 of a self-starting synchronous motor 100 and to cause displacement of a contact member 101, driven thereby through a friction clutch, from an initial position an amount proportional to the magnitude of the antilogarithm.

Following each advancement of the contact member 101 proportional to the antilogarithm of the logarithm of the ratio of $W_F^2$ to $f(A_I)$ I produce a further advancement thereof proportional to the antilogarithm of the logarithm of the ration of $W_F^2$ to $f(A_O)$ and thereby move the contact member 101 during each cycle of operation an amount proportional to the sum of said ratios, or as evident, proportional to the mean density of the fluid within the second heating section 5. I obtain this subsequent advancement of the contact member 101 through apparatus similar to that described for obtaining the initial advancement. Thus engagement of contact 76 with cam 78 serves to energize a winding 102 of a motor 103 having an opposed winding 104. Engagement of the contact 88 with the cam 86 serves to energize the latter winding. The difference in time duration of the energization of windings 102 and 104 serves to position a movable member 105 from the initial position shown. The displacement of the member 105 occurs simultaneously with the displacement of the member 93. However, during that part of the cycle of complete operation when member 93 is being returned to the neutral position, and hence establishing an impulse effective for positioning the contact member 101, the member 105 remains stationary. When, however, the member 93 has been restored to the initial position the member 105 will be restored to its initial position through the agency of cams 106, 107 which are rotated by a motor 108 periodically energized through a conducting segment 109 of the drum 80. It will be evident that the member 105 will be restored to the initial position subsequent to such restoration of the member 93, due to the fact that the segment 109 follows the segment 97.

The cams 106 and 107 act in the same way as the cams 95 and 94 respectively and periodically establish an electric impulse proportional to the antilogarithm of the logarithm of the ratio of the weight rate of fluid flow to $f(A_O)$. The electric impulses established through engagement of the contact member 105 with either the cams 106 or 107 act to cause a further displacement of the member 101. Thus for each cycle of operation of the cams 94, 95 and 106, 107 the member 101 will be advanced an amount proportional to the sum and hence the mean of the ratios determined by the apparatus described, or expressed mathematically:

$$A_{101} = \left[ \frac{W_F^2}{f(A_I)} + \frac{W_F^2}{f(A_o)} \right]$$

where A₁₀₁=Periodic displacement of member 101.

To provide a visual indication or record of the displacement of the member 101, I provide means for restoring it to the initial position subsequent to each advancement, and in so restoring it originating an electric impulse of a time duration proportional to its displacement and thence utilizing such impulse to control the positioning of a suitable member, such as that index 110.

After operation of the motor 108 further rotation of the drum 80 causes segment 111 to energize a motor 112 for a length of time sufficient to cause a complete revolution of a cam 113 from the normal position shown. In the rotation of cam 113, a cam follower 114 will engage the contact member 101 and return it to the initial position. If the cam 113 is of uniform rise then the time duration of such engagement between the members 101 and 114 will be proportional to the displacement of the member 101 from the initial position. Engagement of members 101, 114 energize a winding 115 of a reversible motor 116.

Simultaneously with the energization of motor 112 a motor 117 is energized for a sufficient length of time to cause a cam 118 rotated thereby to pass through one complete revolution. During a part of each revolution of the cam 118 a contact member 119 is engaged for a time duration proportional to its position. Such engagement of the cam 118 with the contact member 119 energizes a winding 120 of the motor 116. As the cams 113 and 118 rotate in phase the motor 116 will rotate in one direction or another for an increment of time proportional in duration to the difference in time length of energization of the winding 115 as compared with the winding 120. Thus if the time duration of energization of winding 115 is greater than that of the winding 120, then the motor 116 will rotate in a counterclockwise direction an amount proportional to the difference in time length of energization. Conversely, if the winding 120 is energized for the longer increment of time then the motor 116 will rotate in a clockwise direction.

The motor 116 positions, through a suitable linkage arrangement, a fulcrumed lever 121 about a fixed fulcrum 122. The lever 121 positions the index 110 relative to a time rotatable chart 123 which may be driven by any suitable clock mechanism (not shown) so that a record of the mean density relative to time will be inscribed thereon. Also cooperating with the index 110 is a suitably graduated scale 124 whereby the instantaneous mean density is continuously indicated.

The contact member 119 normally rests against the lever 121 and is pivoted at the fulcrum 122. Its normal position therefore corresponds to the position of the index 110 and the time duration of the electric impulses formed by engagement of the cam 118 with the contact member 119 will be proportional to the position of the index 110. Those contacts formed by engagement of the contact member 114 with the arm 101 are proportional in time duration to the mean density of the fluid in the second heating section 5. Accordingly it may be said that the motor 116 compares the time duration of the impulses formed through engagement of cam 118 with contact member 119, and those formed by engagement of contact member 114 with arm 101; and then varies the time duration of the former to bring them to the same duration as the latter, when the position of index 110 will be in proportion to the mean density.

While the apparatus disclosed in Fig. 3 is arranged to determine the mean density of the fluid in the second heating section 5, it may readily be utilized to determine only the density of the fluid at the orifice 8 or at the orifice 7. Thus in the conductor leading to the motor 100 from the cams 106—107 I show a manually operable switch 125. By opening this switch to the position shown in dotted line the motor 100 will only be periodically energized through engagement of the cam 94 or cam 95 with the contact 98. Accordingly, the index 110 will be positioned to correspond with the time duration of the impulses formed by such engagement, or to correspond with the density of the fluid at the orifice 7. Similarly I show in the conductor from cams 94, 95 to the motor 100 a manually operable switch 126 which, if moved to the open position as shown in dotted line, will cause the motor 100 to be energized solely through engagement of cam 106 or cam 107 with contact arm 105, and accordingly the indicator will then be positioned solely in accordance with the density at the orifice 8.

While I have illustrated my invention adapted to determine density at a point remote from a reference point or the mean density between two points remote from a reference point, it will be evident that it may be adapted to other uses and that in general the apparatus is capable of determining the ratio between any two variables or the mean between any two variables; that while in the embodiments shown means are provided for correcting the meter of the weight rate of flow for changes in density, the apparatus will, notwithstanding that density determinations of the fluid are impossible, indicate the change in density between the metering or reference point and the point or points remote therefrom.

Figure 5:
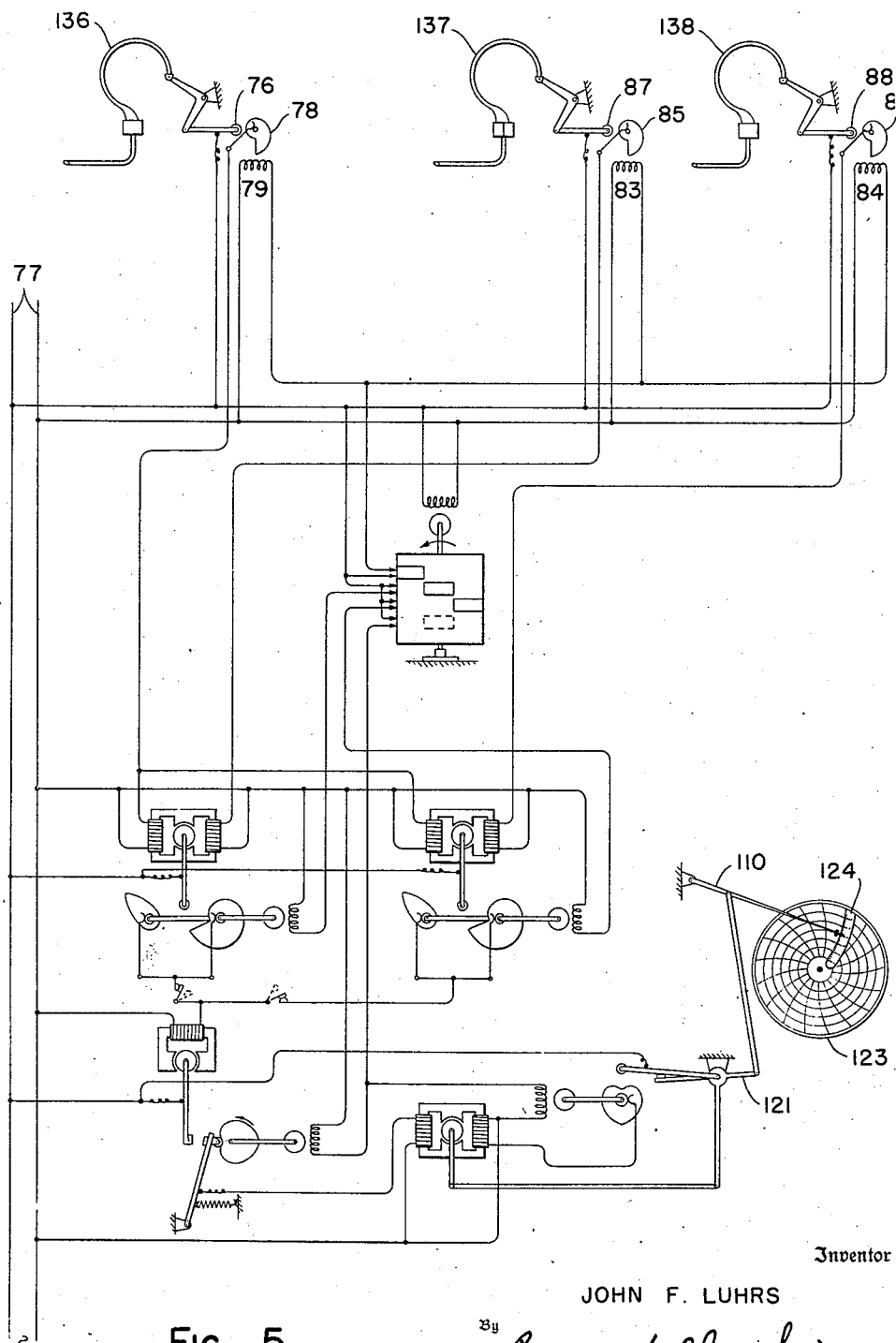
Fig. 5 is similar to Fig. 3 but illustrates pressure sensitive means.

In Figs. 5 and 6 I have followed the general arrangements of Figs. 3 and 1 respectively, but have shown that Bourdon pressure sensitive tubes 136, 137 and 138 may be substituted for the pressure differential devices of Figs. 3 and 1. Such Bourdon tubes may be sensitive to fluid pressures in the same or in different fluid treating systems or may be a part of a temperature measuring system. Thus I disclose fully the application of my invention to the determining of the ratio, average, sum or mean of any two variables. Naturally the control provisions of Fig. 4 are equally adaptable to the arrangements of Figs. 5 and 6.

Further, while I have chosen to illustrate and describe the functioning of my invention in connection with the heating of petroleum or hydrocarbon oil, it is to be understood that the apparatus is equally applicable to the treatment, processing, or working of other fluids, such for example, as in the vaporization of water to form steam.

This application constitutes a continuation-in-part of my co-pending application Serial No. 193,333, filed March 1, 1938, and now Patent No. 2,217,642, dated October 8, 1940.

What I claim as new, and desire to secure by Letters Patent of the United States, is:

1. In an apparatus for determining the ratio between two variables, in combination, a movable member, means periodically moving said member from an initial position a distance proportional to the difference in the logarithms corresponding to the magnitude of each of said variables, a cam having an antilogarithmic contour, means for periodically rotating said cam at a constant rate of speed thereby restoring said movable member to the initial position after each displacement therefrom and engaging said movable member for an increment of time proportional to the antilogarithm of its displacement from the initial position, and means for exhibiting the time duration of the engagement of said member with said cam.

2. In an apparatus for determining the ratio between two variables, in combination, a movable member, means periodically moving said member from an initial position for a period of time proportional to the difference between the logarithms corresponding to the magnitudes of said variables, means for periodically restoring said movable member to the initial position in an increment of time proportional to the antilogarithm of the period of time of the displacement of the movable member from the initial position, and a second member positioned from an initial position in proportion to the magnitude of said increments of time.

3. In an apparatus for determining the ratio between two variables, in combination, means periodically originating electric impulses proportional in time length to the logarithm of one of said variables, means periodically originating electric impulses of a time length proportional to the logarithm of the other of said variables, means periodically originating electric impulses of a time duration proportional to the antilogarithm of the difference in time lengths of said first two named series of periodic impulses, and indicating means positioned in accordance with the time duration of said last named impulses.

4. In a telemetric transmitter for periodically originating electric impulses of a period of time proportional to a function of a variable having a zero magnitude for a finite value of the function, comprising in combination, a movable member periodically moved from an initial position in an amount proportional to the magnitude of the variable and in sense dependent upon the algebraic sign of the variable, a first cam for periodically restoring said movable member to the neutral position when displaced from the initial position in one sense, a second cam for periodically restoring said movable member to the initial position when displaced from the neutral position in opposite sense, and contact means controlled by said cams and member for originating an electric impulse proportional in time length to the time required for said cams to restore said movable member to the neutral position.

5. In a telemetric transmitter for periodically originating electric impulses of a period of time proportional to a function of a variable having a zero magnitude when the function of the variable is not equal to zero comprising in combination, a movable member adapted to be periodically displaced from an initial position an amount corresponding to the magnitude of the variable and in sense dependent upon the sign of the variable, a cyclically operated cam for restoring said movable member to the initial position subsequent to each periodic displacement disposed on either side of said member, one of said cams shaped to correspond with the functional relation existing between said variable and function when said variable is positive and the other of said cams shaped to correspond with the functional relation existing between said variable and function when said variable is negative, and circuit controlling means operated by the joint action of said cams and member.

6. Apparatus for controlling a fluid treating system having a forced circulation path to one end of which the fluid is supplied under pressure, comprising in combination, means for heating the fluid path, means cyclically telemetering a first signal having a characteristic corresponding to the logarithm of the weight rate of fluid flow through the heated fluid path, a variable area orifice in said fluid path located at a reference point subsequent to the entrance to the path, means for varying the area of said orifice to maintain a predetermined differential pressure thereacross, means cyclically telemetering a second signal having a characteristic corresponding to the logarithm of the area of said orifice, means for determining the difference in characteristic of said signals, and means positioned by said last-named means for controlling the heating means of said fluid path.

7. Apparatus for controlling a fluid treating system having a forced circulation path to one end of which the fluid is supplied under pressure, comprising in combination, means for heating the path, means cyclically telemetering a first signal having a characteristic corresponding to the logarithm of the weight rate of fluid flow through the heated fluid path, a variable area orifice in said heated path through which said fluid flows located at a reference point subsequent to the entrance to the path, means for varying the area of said orifice to maintain a predetermined differential pressure thereacross, means cyclically telemetering a second signal having a characteristic corresponding to the logarithm of the area of said orifice, means for determining the difference in characteristic of said telemetered signals, and means positioned by said difference in characteristic of said signals for controlling the rate of fluid supply to the fluid path.

8. Apparatus for controlling a fluid treating system having a forced circulation path to one end of which the fluid is supplied under pressure, comprising in combination, means for heating the path, means cyclically telemetering a first signal having a characteristic corresponding to the logarithm of the weight rate of fluid flow through the path, a variable area orifice through which the heated fluid flows and located at a reference point subsequent to the entrance to the path, means for varying the area of said orifice to maintain a predetermined differential pressure thereacross, means cyclically telemetering a second signal having a characteristic corresponding to the logarithm of the area of said orifice, means for determining the difference in characteristic of said signals, and means positioned by said difference in characteristic of said first and second signals for controlling the treating of the fluid in the path.

9. Apparatus for controlling a fluid treating system having a forced circulation path to one end of which the fluid is supplied under pressure, comprising in combination, means for treating the fluid as it flows through said path, means cyclically telemetering a first signal having a time duration corresponding to the logarithm of the weight rate of fluid flow through the treated fluid path, a variable area orifice through which the treated fluid flows located at a reference point subsequent to the entrance to the fluid path, means for varying the area of said orifice to maintain a predetermined differential pressure thereacross, means cyclically and simultaneously with said first signal telemetering a second signal having a time duration corresponding to the logarithm of the area of said orifice, a receiver responsive to both of said signals and positioned in accordance with the antilogarithm of the difference in time duration of said first and second signals, and treatment control means positioned by said receiver.

10. In a measuring apparatus of the type having means responsive to a variable such as for example, fluid rate of flow, pressure, or the like, including a telemetric system of the time electric impulse type; the improvement comprising a first transmitter having means sensitive to the value of a first variable, means cooperating with the first named means periodically originating electric impulses of a time duration varying in logarithmic relation to the value of the first variable, a second transmitter having means sensitive to the value of a second variable, means cooperating with the second transmitter means periodically originating electric impulses of a time duration varying in logarithmic relation to the value of the second variable, and receiving means accumulating and integrating said periodic impulses providing a manifestation of the relation between the two variables.

11. Control apparatus including in combination, means producing periodic electric impulses proportional to a logarithmic function of a fluid variable to be controlled, control means for the fluid variable, and means sensitive to departure of the fluid variable from a desired value for causing the first means to position the control means in a direction to return the fluid variable to said desired value.

JOHN F. LUHRS.